(12) United States Patent
Kelsall et al.

(10) Patent No.: US 9,631,529 B2
(45) Date of Patent: Apr. 25, 2017

(54) EROSION RESISTANT MOUNTING MATS (75) Inventors: Adam Kelsall, Runcorn (GB); Kelvin Weeks, Runcorn (GB); Jonathan Cross, Runcorn (GB); Steven McBride, Runcorn (GB)

(73) Assignee: Saffil Automotive Limited, Sheffield, South Yorkshire (GB)

( * ) Notice: Subject to any disclaimer, the term of this patent is extended or adjusted under 35 U.S.C. 154(b) by 638 days.

(21) Appl. No.: 13/265,714

(22) PCT Filed: Apr. 21, 2010

(86) PCT No.: PCT/GB2010/050649
§ 371 (c)(1),
(2), (4) Date: Dec. 2, 2011

(87) PCT Pub. No.: WO2010/122337
PCT Pub. Date: Oct. 28, 2010

(65) Prior Publication Data
US 2012/0100046 A1     Apr. 26, 2012

(30) Foreign Application Priority Data
Apr. 21, 2009  (GB) .................................. 0906837.0

(51) Int. Cl.
*F01N 3/021*     (2006.01)
*F01N 3/28*      (2006.01)

(52) U.S. Cl.
CPC .......... *F01N 3/0211* (2013.01); *F01N 3/2853* (2013.01); *F01N 2350/06* (2013.01); *Y02T 10/20* (2013.01)

(58) Field of Classification Search
CPC ........ F01N 3/28; F01N 3/021; F01N 2350/06; F01N 3/2853; D04H 1/58; Y02T 10/20
USPC ............... 15/300.1; 106/14.05, 14.14, 287.1; 422/177; 428/66.3, 66.4, 66.7, 74, 80, 428/88, 141, 144, 149, 192, 193, 195.1, 428/212, 220, 446, 447, 454; 442/76, 442/121; 3/300.1
See application file for complete search history.

(56) References Cited

U.S. PATENT DOCUMENTS

| | | |
|---|---|---|
| 3,012,923 A | 12/1961 | Slayter |
| 3,224,927 A | 12/1965 | Brown et al. |
| 3,510,394 A | 5/1970 | Cadotte |
| 3,649,406 A | 3/1972 | McNish |
| 3,674,621 A | 7/1972 | Miyamoto et al. |

(Continued)

FOREIGN PATENT DOCUMENTS

| | | |
|---|---|---|
| DE | 295 18 939 U1 | 2/1996 |
| DE | 199 57 692 A1 | 5/2001 |

(Continued)

OTHER PUBLICATIONS

Comparative Study of Various Preparation Methods of Colloidal Silica. Nov. 22, 2010. Hyung Mi Lim et al.*

(Continued)

*Primary Examiner* — Arti Singh-Pandey
(74) *Attorney, Agent, or Firm* — Curatolo Sidoti Co., LPA; Joseph G. Curatolo; Vincent A. Cortese (57) ABSTRACT

A mat for supporting a monolith, the mat comprising one or more first portions comprising fibers at least partially coated with an erosion resistant inorganic (e.g. silica) gel composition or a precursor thereof.

17 Claims, 8 Drawing Sheets

(56) References Cited

U.S. PATENT DOCUMENTS

| | | |
|---|---|---|
| 3,771,967 A | 11/1973 | Nowak |
| 3,785,838 A | 1/1974 | Weidman |
| 3,798,006 A | 3/1974 | Balluff |
| 3,861,881 A | 1/1975 | Nowak |
| 3,957,573 A | 5/1976 | Miyamoto et al. |
| 3,996,145 A | 12/1976 | Hepburn |
| 4,011,651 A | 3/1977 | Bradbury et al. |
| 4,093,423 A | 6/1978 | Neumann |
| 4,101,280 A | 7/1978 | Frietzsche et al. |
| 4,142,864 A | 3/1979 | Rosynsky et al. |
| 4,204,907 A | 5/1980 | Korklan et al. |
| 4,269,887 A | 5/1981 | Sonobe et al. |
| 4,271,228 A | 6/1981 | Foster et al. |
| 4,279,864 A | 7/1981 | Nara et al. |
| 4,328,187 A | 5/1982 | Musall et al. |
| 4,332,852 A | 6/1982 | Korklan et al. |
| 4,335,077 A | 6/1982 | Santiago et al. |
| 4,353,872 A | 10/1982 | Midorikawa |
| 4,385,135 A | 5/1983 | Langer et al. |
| 4,447,345 A | 5/1984 | Kummermehr et al. |
| 4,617,176 A | 10/1986 | Merry |
| 4,693,338 A | 9/1987 | Clerc |
| 4,735,757 A | 4/1988 | Yamamoto et al. |
| 4,752,515 A | 6/1988 | Hosoi et al. |
| 4,823,845 A | 4/1989 | Martin et al. |
| 4,849,382 A | 7/1989 | Shibata et al. |
| 4,863,700 A | 9/1989 | Ten Eyck |
| 4,927,608 A | 5/1990 | Wörner et al. |
| 4,929,429 A | 5/1990 | Merry |
| 4,985,212 A | 1/1991 | Kawakami et al. |
| 4,999,168 A | 3/1991 | Ten Eyck |
| 5,002,836 A | 3/1991 | Dinwoodie et al. |
| 5,032,441 A | 7/1991 | Ten Eyck et al. |
| 5,073,432 A | 12/1991 | Horikawa et al. |
| 5,094,074 A | 3/1992 | Nishizawa et al. |
| 5,139,615 A | 8/1992 | Conner et al. |
| 5,145,811 A | 9/1992 | Lintz et al. |
| 5,151,253 A | 9/1992 | Merry et al. |
| 5,167,765 A | 12/1992 | Nielsen et al. |
| 5,250,269 A | 10/1993 | Langer |
| 5,290,350 A | 3/1994 | Besnard et al. |
| 5,290,522 A | 3/1994 | Rogers et al. |
| 5,380,580 A | 1/1995 | Rogers et al. |
| 5,384,188 A | 1/1995 | Lebold et al. |
| 5,389,716 A | 2/1995 | Graves |
| 5,419,975 A | 5/1995 | Lintz et al. |
| 5,453,116 A | 9/1995 | Fischer et al. |
| 5,482,686 A | 1/1996 | Lebold et al. |
| 5,488,826 A | 2/1996 | Paas |
| 5,502,937 A | 4/1996 | Wilson |
| 5,567,536 A | 10/1996 | Lintz et al. |
| 5,580,532 A | 12/1996 | Robinson et al. |
| 5,666,726 A | 9/1997 | Robinson et al. |
| 5,811,063 A | 9/1998 | Robinson et al. |
| 5,862,590 A | 1/1999 | Sakashita et al. |
| 5,869,010 A | 2/1999 | Langer |
| 5,955,177 A | 9/1999 | Sanocki et al. |
| 6,000,131 A | 12/1999 | Schmitt |
| 6,051,193 A | 4/2000 | Langer et al. |
| 6,101,714 A | 8/2000 | Schmitt |
| 6,162,404 A | 12/2000 | Tojo et al. |
| 6,183,852 B1 | 2/2001 | Rorabaugh et al. |
| 6,231,818 B1 | 5/2001 | TenEyck |
| 6,251,224 B1 | 6/2001 | Dong |
| 6,267,843 B1 | 7/2001 | Helwig et al. |
| 6,317,976 B1 | 11/2001 | Aranda et al. |
| 6,468,932 B1 | 10/2002 | Robin et al. |
| 6,589,488 B1 | 7/2003 | Eyhorn |
| 6,726,884 B1 | 4/2004 | Dillon et al. |
| 6,733,628 B2 | 5/2004 | Dinwoodie et al. |
| 6,737,146 B2 | 5/2004 | Schierz et al. |
| 6,756,107 B1 | 6/2004 | Schierz et al. |
| 6,855,298 B2 | 2/2005 | TenEyck |
| 6,923,942 B1 | 8/2005 | Shirk et al. |
| 6,987,076 B1 | 1/2006 | Jubb et al. |
| 7,033,412 B2 | 4/2006 | Kumar et al. |
| 7,153,796 B2 | 12/2006 | Jubb et al. |
| 7,160,503 B2 | 1/2007 | Weaver |
| 7,261,864 B2 | 8/2007 | Watanabe |
| 7,276,280 B2 | 10/2007 | Dinwoodie et al. |
| 7,387,822 B2 | 6/2008 | Dinwoodie |
| 7,550,118 B2 | 6/2009 | Merry |
| 7,820,117 B2 | 10/2010 | Peisert et al. |
| 7,887,917 B2 | 2/2011 | Zoitos et al. |
| 7,971,357 B2 | 7/2011 | Ten Eyck et al. |
| 8,178,052 B2 * | 5/2012 | Dietz .................... 422/179 |
| 8,226,897 B2 * | 7/2012 | Kunze ............... C04B 41/009 422/179 |
| 8,617,475 B2 * | 12/2013 | Dietz et al. ............. 422/179 |
| 2001/0036427 A1 | 11/2001 | Yamada et al. |
| 2002/0025750 A1 | 2/2002 | Dinwoodie |
| 2002/0025904 A1 | 2/2002 | Goto et al. |
| 2002/0127154 A1 | 9/2002 | Foster et al. |
| 2003/0049180 A1 | 3/2003 | Fukushima |
| 2003/0056861 A1 | 3/2003 | Weaver |
| 2003/0185724 A1 | 10/2003 | Anji et al. |
| 2004/0052694 A1 | 3/2004 | Nishikawa et al. |
| 2004/0234436 A1 | 11/2004 | Howorth |
| 2005/0272602 A1 | 12/2005 | Ninomiya |
| 2006/0154040 A1 | 7/2006 | Merry |
| 2006/0278323 A1 | 12/2006 | Eguchi |
| 2007/0065349 A1 | 3/2007 | Merry |
| 2007/0207069 A1 | 9/2007 | Kariya et al. |
| 2007/0218320 A1 | 9/2007 | Weaver |
| 2008/0253939 A1 | 10/2008 | Hornback |
| 2009/0022633 A1 | 1/2009 | Tomosue et al. |
| 2009/0060800 A1 | 3/2009 | Fernandez |
| 2009/0060802 A1 | 3/2009 | Beauharnois |
| 2009/0114097 A1 | 5/2009 | Saiki |
| 2009/0162266 A1 | 6/2009 | Ten Eyck et al. |
| 2010/0055004 A1 | 3/2010 | Olson et al. |
| 2010/0150791 A1 * | 6/2010 | Kunze ............... C04B 41/009 422/179 |
| 2010/0173552 A1 | 7/2010 | Fernando et al. |
| 2010/0207298 A1 | 8/2010 | Kunze et al. |
| 2010/0209306 A1 | 8/2010 | Kunze et al. |
| 2010/0266462 A1 | 10/2010 | Kumar |
| 2011/0023430 A1 | 2/2011 | Kumar et al. |
| 2011/0033343 A1 | 2/2011 | Fernandes, Jr. |
| 2011/0036063 A1 | 2/2011 | Kumar |
| 2011/0094419 A1 | 4/2011 | Fernando et al. |
| 2011/0097246 A1 | 4/2011 | Beauharnois et al. |
| 2011/0123417 A1 | 5/2011 | Ten Eyck et al. |
| 2011/0126499 A1 | 6/2011 | Kumar |
| 2011/0150715 A1 | 6/2011 | Kumar |
| 2011/0150717 A1 | 6/2011 | Kumar et al. |
| 2011/0311403 A1 | 12/2011 | Kumar et al. |
| 2011/0311404 A1 | 12/2011 | Creedon et al. |
| 2012/0039756 A1 | 2/2012 | Beauharnois |
| 2012/0183449 A1 | 7/2012 | Beauharnois |

FOREIGN PATENT DOCUMENTS

| | | |
|---|---|---|
| EP | 0 009 940 A1 | 4/1980 |
| EP | 0 205 704 A1 | 12/1986 |
| EP | 0 279 511 A2 | 8/1988 |
| EP | 0 319 299 A2 | 6/1989 |
| EP | 0 363 911 A2 | 4/1990 |
| EP | 0 398 130 A2 | 11/1990 |
| EP | 0 465 203 A1 | 1/1992 |
| EP | 0 522 722 A1 | 1/1993 |
| EP | 0 573 834 A1 | 12/1993 |
| EP | 0 765 993 A1 | 4/1997 |
| EP | 0 803 643 A1 | 10/1997 |
| EP | 0 834 936 A1 | 4/1998 |
| EP | 1 267 048 A1 | 12/2002 |
| EP | 1 495 807 A1 | 1/2005 |
| EP | 1 533 409 A1 | 5/2005 |
| EP | 1 696 110 A1 | 8/2006 |
| EP | 1 830 043 A1 | 9/2007 |
| EP | 1 905 895 A1 | 4/2008 |
| EP | 1 931 862 A1 | 6/2008 |
| EP | 1 950 035 A1 | 7/2008 |
| FR | 2 196 008 A5 | 3/1974 |

(56) References Cited

FOREIGN PATENT DOCUMENTS

| | | |
|---|---|---|
| GB | 1 438 762 A | 6/1976 |
| GB | 1 438 784 | 6/1976 |
| GB | 2 116 476 A | 9/1983 |
| GB | 2 125 458 A | 3/1984 |
| GB | 2 200 129 A | 7/1988 |
| GB | 2 319 247 A | 5/1998 |
| JP | S 61-87614 | 12/1987 |
| JP | 6-272549 | 9/1994 |
| JP | 7-286514 | 10/1995 |
| JP | 2002276350 A | 9/2002 |
| WO | WO 93/23245 | 11/1993 |
| WO | WO 97/32118 A1 | 9/1997 |
| WO | WO 98/04404 | 2/1998 |
| WO | WO 99/23370 A1 | 5/1999 |
| WO | WO 99/46028 A1 | 9/1999 |
| WO | WO 00/75496 A1 | 4/2000 |
| WO | WO 01/65008 A1 | 4/2000 |
| WO | WO 01/83956 A1 | 11/2001 |
| WO | WO 02/33233 A1 | 4/2002 |
| WO | WO 02/053511 A1 | 7/2002 |
| WO | WO 03/000414 A1 | 1/2003 |
| WO | WO 03/031368 A2 | 4/2003 |
| WO | WO 2004/064996 | 8/2004 |
| WO | WO 2005/106222 | 11/2005 |
| WO | WO 2006/055188 A1 | 5/2006 |
| WO | WO 2006/065534 | 6/2006 |
| WO | WO 2007/143437 | 12/2007 |
| WO | WO 2008/059249 | 5/2008 |
| WO | WO 2008/103525 A2 | 8/2008 |
| WO | WO 2008/154078 A1 | 12/2008 |
| WO | WO 2008/156942 A1 | 12/2008 |
| WO | WO 2011/067598 | 6/2011 |

OTHER PUBLICATIONS

Gulati, Ten Eyck & Lebold. "Durable Packaging Design for Cordierite Ceramic Catalysts for Motorcycle Application" Society of Automotive Engineers Meeting, Detroit, MI, Mar. 1, 1993.
Maret, Gulati, Lambert & Zink, Systems Durability of a Ceramic Racetrack Converter. Internationals Fuels and Lubricants Meeting, Toronto, Canada, Oct. 7-10, 1991.
Product Brochure—"There's More to it Than You Think, HDK—Pyrogenic Silica", Wacker Silicones, 6173/10.05/e.
Technical Data Sheet—"HDK N20 Pyrogenic Silica", Wacker Silicones, Version 1.0, Jun. 12, 2008.
International Search Report and Written Opinion mailed Sep. 28, 2010 in PCT/GB2010/050649, corresponding to U.S. Appl. No. 13/265,714.
International Preliminary Report on Patentability completed on Jul. 13, 2011 in PCT/GB2010/050649, corresponding to U.S. Appl. No. 13/265,714.
Japanes Office Action for corresponding Japanese Application No. 2012-506578, mailed May 17, 2016.

\* cited by examiner

EROSION RESISTANT MOUNTING MATS

BACKGROUND OF THE INVENTION

The present invention relates to mats such as mats useful for mounting catalytic convertors and to methods for making mats.

It is known to catalyse oxidation or reduction of combustion products by passing the products into intimate contact with a catalyst. It is also known to remove unwanted entrained particulate matter by filtering a stream of fluid, e.g. gas.

Vehicle exhaust gases are treated to reduce the amount of noxious gases which are emitted to the atmosphere. Vehicles typically use a catalytic convertor (CC), such as close coupled or underbody petrol or diesel oxidation catalysts or selective catalytic reduction devices. Cars which use diesel as a fuel are typically fitted with a diesel particulate filter (DPF) to reduce the emission of small particles of soot and other materials produced during combustion.

Both CCs and DPFs are typically fabricated as ceramic monoliths through which the combustion products pass before they are emitted from the exhaust. The ceramic monoliths are fragile and relatively expensive. Accordingly, it is important to protect them from damage during use.

The monolith is located within a metal can mounted as part of a vehicle's exhaust system. As combustion products pass through the monolith they heat it, causing the monolith to expand. Of course, the can will also heat and expand. Clearly, as the two materials will heat and expand at different rates, there is a potential for relative movement between the can and the monolith. In the conditions found in a vehicle exhaust system there is also significant vibration which could also cause the monolith to become damaged if not securely held.

To ensure that monoliths are securely held they are typically wrapped in mounting mats. These mats may be formed using intumescent or non-intumescent materials. Similar materials may be used for other automotive thermal insulation applications, particularly those where gas flows may impinge thereon.

Non-intumescent materials may include fibres chosen from ceramic or glass fibres such as silica, alumino silicates, borosilicates, alumina, zirconia and the like. The fibres are usually held in a binder matrix to aid handleability, although additional and/or alternative consolidation techniques may be used, e.g. needling.

If present, the binder may be arranged to decompose and be burned off from the mat so as to allow the mounting mat to adopt a configuration to exert pressure on the monolith and the walls of the can to securely hold the monolith in place during use. It will be appreciated that the holding force will need to be maintained throughout thermal cycling regimes. Another factor which is important is the friction coefficient between can and mat and mat and monolith. Clearly, if the coefficient of friction is too low, then the mat and/or the monolith may slip relative to the can which may impair performance or lead to damage of the monolith.

Accordingly, it is desirable to have a mounting mat material which is thermally stable and which can compensate for differential expansion rates of the can and monolith whilst maintaining a minimum holding pressure on the monolith and having suitable frictional characteristics.

It is also important to consider that the mat should provide a significant resistance to fluid flow therethrough, while in situ between the monolith and the can. This is necessary to ensure that fluid flows preferentially (e.g. exclusively) through the monolith, thereby being exposed to the catalyst or filter.

Close coupled catalytic convertors are those catalytic convertors which are situated close to the engine where the exhaust gases for treatment are at a higher temperature than are those in a more conventional CC position close to, or towards, the rear of the vehicle. One advantage of close coupled CCs is that the greater heat from the exhaust fumes causes the catalyst to heat to its effective temperature more quickly, therefore making the CC more efficient, particularly when starting the engine from cold.

However, a problem associated with the provision of a close coupled CC is that the mounting mat is susceptible to erosion by the hot fluid flow, particularly at its upstream edge. Over time, this erosion has negative effects on the performance of the mat, for example reducing the holding pressure exerted by the mat on the monolith or allowing more fluid to pass through the mat rather than the monolith, i.e. bypassing the monolith.

It is therefore an object of the present invention to provide a mounting mat which is resistant to erosion, especially (although not exclusively) when deployed to hold a close coupled CC.

It is known to add a rigidising compound, such as colloidal particles, e.g. silica or alumina sols, to a mat before it is canned with a monolith in a close coupled CC system. This rigidising compound is used so as to mitigate the effect of the erosion of the mat, but because of its 'rigid' nature it also makes the mat much less flexible, thereby making it more difficult to wrap the mat around the monolith. Typically, then, the installer must apply the rigidising compound to the mat immediately prior to canning, such that the mat and monolith can be sealed in the exhaust system before the rigidising compound dries. This both is time-consuming and expensive and it requires installers to handle potentially hazardous chemicals. The latter issue increases safety and cost concerns for the installer. It also means that suppliers have to supply mats and the rigidising compound, thereby increasing costs to the supplier.

It is therefore an object of the invention to provide an erosion resistant mat which does not require a treatment to be performed by installers prior to installation and/or can be transported in a flat condition and/or is readily installable and/or providing a flexible mat and/or is not damaged or destroyed before or during the installation process.

Monoliths which are not of circular cross section, such as oval or racetrack monoliths, represent a further challenge to the production of erosion resistant mats. This is at least in part because the shape of the monolith dictates that the compression of the mat, measured as fibre gap bulk density (FGBD) will not be constant around the circumference of a mounted monolith. In turn, this leads to certain parts of the mat, such as those regions in which the mat is less compressed, being more susceptible to erosion.

It is therefore a further object of the invention to provide a mat which exhibits resistance to erosion when mounting a monolith which has non-uniform mounting characteristics.

The Pressure Performance (PP) of a mat relates to the pressure exerted by a mat on a monolith at a particular FGBD. It is a further object of the invention to provide a mat having an improved PP.

In this specification, the terms "erosion resistant" and "resistant to erosion" and similar phrases denote compounds, treatments or substances which have a greater resistance to erosion than an untreated fibre mat.

SUMMARY OF THE INVENTION

According to a first aspect, the invention provides a mat for supporting a monolith, the mat comprising one or more first portions comprising fibres at least partially coated with a coating of an erosion resistant inorganic (e.g. silica) gel composition or a precursor thereof.

According to a further aspect of the invention, there is provided a mat for supporting a monolith, the mat comprising one or more first portions comprising fibres at least partially coated with an erosion resistant inorganic (e.g. silica) gel composition or a precursor thereof, the composition or precursor coating the fibres so as to leave interstices of the fibres substantially free of the composition or precursor.

Preferably, the coating has a average thickness less than 50%, e.g. less than 45%, 40%, 35%, 30%, 25%, 20%, 15%, 10% or 5%, of the average diameter of the fibres. In providing a thin coating, interstitial spaces between the fibres are left substantially free of the gel composition or precursor. The gel or precursor thereof may form or be provided so as to lie between, e.g. retain closely adjacent and/or abutting or touching fibres.

Preferably, the mat comprises a second portion substantially free from said erosion resistant inorganic gel composition or the precursor thereof.

Preferably, the inorganic gel composition comprises a silica compound or silicone polymer or gel, formed on the fibres by an acid or base catalysed reaction of a silica precursor, such as hydrolysis and/or condensation of an organosiloxane compound.

According to a further aspect of the invention, there is provided a mat for supporting a monolith, the mat comprising one or more first portions treated with an erosion resistant compound or a precursor thereof and a second portion substantially free from said erosion resistant compound or the precursor thereof.

The erosion resistant compound preferably comprises a silica compound or silicone polymer or gel, preferably formed by reaction of a silica precursor, such as hydrolysis and/or condensation of an organosiloxane compound.

Preferably the major surface area of the first portion or portions comprises less than 80%, e.g. less than 70%, 60%, or 50% of the major surface area of the mat. More preferably the major surface area of the first portion or portions comprise less than 40%, less than 30%, less than 20% or less than 10% of the major surface area of the mat.

Preferably, at least part of the first portion is adjacent at least part of an intended is leading edge of the mat. More preferably, at least part of the first portion is adjacent to all or substantially all of an intended leading edge of the mat.

Preferably, one or each of said at least one first portions extend through at least a part of, and preferably substantially, the entire thickness of the mat.

In some embodiments, the mat comprises a plurality of the first portions. These first portions may be arranged in a random or regular pattern across a major surface of the mat.

Preferably, the plurality of first portions comprise columns of said erosion resistant material, which columns preferably extend through part or substantially all of the thickness of the mat. Preferably, the columns are arranged in a regular pattern, each first column being between 1 mm and 50 mm from its nearest neighbour or neighbours. More preferably, each column is between 5 mm and 25 mm from its nearest neighbour or neighbours.

In another aspect, the invention provides a method for manufacturing an inorganic fibre mat for mounting a catalytic convertor, the method comprising treating at least part of the mat with an aqueous silica precursor mixture.

In a further aspect, the invention provides a method of manufacturing a mounting mat for a catalytic convertor, the method comprising the steps of treating a first portion of the mat with a silica precursor or a precursor thereof.

In some embodiments, substantially the whole of the mat is treated with the mixture. In which case, the silica precursor is preferably present in an aqueous system.

Alternatively, one or more portions of the mat are treated with the mixture, leaving one or more further portions of the mat untreated. Preferably, more than 20%, e.g. more than 30%, 40% or 50% of the mat is left untreated by the silica precursor. More preferably, more than 60%, more than 70%, more than 80% or more than 90% of the mat is left untreated by the silica precursor.

In some embodiments, some or all of the portion of the mat treated by the silica precursor is adjacent some or all of an intended leading edge of the mat.

In some embodiments, a plurality of portions of the mat are treated by the silica precursor, for example to create columns of the silica precursor through some or all of the thickness of the mat. Preferably the plurality of portions of the mat are treated by injecting the silica precursor therein. Alternatively, the plurality of portions may be treated by spotting the silica precursor onto the surface of the portions, injecting or inserting within the mat, printing onto the mat and/or a combination of one or more techniques. Application of the silica precursor may be from one or other or both major surfaces of the mat.

Preferably, additional solvent is added to the portions after treatment, which additional solvent may encourage capillary action to wick the silica precursor through the mat. Varying the quantity of additional solvent added may provide control over the concentration profile of the silica precursor in one or other of the principal axes or in a thickness direction of the mat in the plurality of portions. For example, the or each portion may be partially eluted by the solvent to provide a non-homogeneous concentration profile, e.g., both transversely and vertically, within the mat.

Preferably, each of the plurality of portions is between 1 mm and 50 mm from its nearest neighbour or neighbours. More preferably, each of the plurality of portions is between 5 mm and 25 mm from its nearest neighbour or neighbours. More preferably, each of the plurality of portions is between 10 mm and 20 mm, say 15 mm, from its nearest neighbour or neighbours.

Preferably, the silica precursor comprises a mixture comprising a compound having the formula:

where $R^1$ to $R^4$ are the same or different and may comprise H or substituted or unsubstituted alkyl chains, e.g. $C_1$ to $C_5$ alkyl chains. Preferably, $R^1$ to $R^4$ comprise methyl or ethyl groups. The silica precursor may be a dimer (or accordingly an oligomer) of the compound described above, e.g. where $R^2$ comprises $SiOR^5OR^6OR^7$, where $R^5$ to $R^7$ are the same or different and may comprise H or substituted or unsubstituted alkyl chains, e.g. $C_1$ to $C_5$ alkyl chains.

Preferably, the silica precursor comprises a mixture comprising tetra ethyl orthosilicate.

Preferably, the silica precursor comprises a mixture including water or oil.

Preferably, the silica precursor comprises one or more alcohols, such as one or more of propanol, isopropanol, ethanol or methanol.

Preferably, the silica precursor comprises an acid catalyst. The acid catalyst may comprise a strong acid, such as hydrochloric acid and/or a weak acid, such as acetic acid. Alternatively, the silica precursor comprises a base catalyst. The base catalyst may be a strong base, such as sodium hydroxide and/or a weak base such as piperidine or ammonia.

Preferably, the pH of the silica precursor is between 2 and 10, e.g. between 4 and 8. More preferably, the pH of the silica precursor is between 5 and 7.

Preferably, the silica solids content of the silica precursor is less than 50% by mass, e.g. 48% or less than 40%, 30%, 20%, 15%, 10%, 8%, 7% or 6% by mass.

Preferably, the silica solids content of the silica precursor is less than 5%, 4%, 3%, 2% or 1% by mass. More preferably, the silica solids content of the silica precursor is more than 0.01% by mass, e.g. more than 0.05% or 0.1% by mass.

Preferably, the method further comprises drying the mat. In some embodiments, the mat may be dried at between 10° C. and 200° C. Additionally, or alternatively, the mat may be dried at below normal atmospheric pressure and/or in the presence of steam.

A further aspect of the invention comprises a non intumescent mounting mat for supporting a monolith, the mat comprising a plurality of fibres and a consolidating medium, the consolidating medium comprising an agent applied to the fibres in a plurality of distinct areas extending in a thickness direction of the mat.

The consolidating medium may be a silica compound or silicone polymer or gel, is preferably formed by reaction of a silica precursor, such as hydrolysis and/or condensation of an organosiloxane compound.

A further aspect of the invention provides a silica precursor mixture comprising:
a compound X having the formula:

where $R^1$ to $R^4$ are the same or different and may comprise H or substituted or unsubstituted alkyl chains, e.g. $C_1$ to $C_5$ alkyl chains;
or dimers or oligomers of compound X;
water;
an alcohol;
the mixture having a silica solids content of less than 40% by weight.

Dimers (or accordingly oligomers) of the compound X may take a form where $R^2$ comprises $SiOR^5OR^6OR^7$, where $R^5$ to $R^7$ are the same or different and may comprise H or substituted or unsubstituted alkyl chains, e.g. $C_1$ to $C_5$ alkyl chains.

Preferably, the mixture has a silica solids content of less than 36% by mass, e.g. 35.8%, or less than 35%, 30%, 25%, 23%, 20%, 16%, 15%, 10%, 9% or 5% by mass. Preferably, the mixture has a silica solids content of 0.01% by mass or greater, e.g. greater than 0.05%, 0.1%, 0.5%, 1%, 2%, or 4% by mass.

Preferably, the mixture comprises substantially equal stoichiometric quantities of water and alcohol.

Preferably, the mixture further comprises an acid or base catalyst. The acid catalyst may comprise a strong acid, such as hydrochloric acid and/or a weak acid, such as acetic acid. The base catalyst may be a strong base, such as sodium hydroxide and/or a weak base such as piperidine or ammonia.

Preferably, the pH of the mixture is between 2 and 10, e.g. between 4 and 8. More preferably, the pH of the silica precursor is between 5 and 7.

In another aspect, the invention provides a mounting mat for a monolith, wherein at least part of the mat comprises an erosion resistant material and wherein the mat is undergoes less than 28 $mm^2$ of erosion when subjected to Erosion Test 1 and/or the mat undergoes less than 50 $mm^2$ of erosion when subjected to Erosion Test 2.

In another aspect, the invention provides a mat such as a mat described above, wherein the mat has a minimum wrapping diameter of less than 100 mm according to Flexibility Test 1 and/or a flexibility of less than 180 $mm^2N^{-1}$ according to Flexibility Test 2.

Preferably, the mat has a minimum wrapping diameter of less than 95 mm, e.g. less than 90 mm, 85 mm, 80 mm, 78 mm, 76 mm, 75 mm, 74 mm, 73 mm, 72 mm, 71 mm or 70 mm according to Flexibility Test 1.

Preferably, the mat has a flexibility of less than 180 $mm^2N^{-1}$, e.g. less than 120 $mm^2N^{-1}$, 116 $mm^2N^{-1}$, 110 $mm^2N^{-1}$, 100 $mm^2N^{-1}$, 95 $mm^2N^{-1}$, 94 $mm^2N^{-1}$, 93 $mm^2N^{-1}$, 92 $mm^2N^{-1}$, 91 $mm^2N^{-1}$, 90 $mm^2N^{-1}$, 89 $mm^2N^{-1}$, 88 $mm^2N^{-1}$, 87 $mm^2N^{-1}$, 86 $mm^2N^{-1}$, 85 $mm^2N^{-1}$, 84 $mm^2N^{-1}$, 80 $mm^2N^{-1}$, 75 $mm^2N^{-1}$, 70 $mm^2N^{-1}$ or 69 $mm^2N^{-1}$ according to Flexibility Test 2

In another aspect, the invention provides a dry, flexible mat for canning, the mat having an erosion resistant medium or precursor thereof on at least part of the mat.

In a further aspect, the invention provides a catalytic convertor comprising a mounting mat as described herein.

BRIEF DESCRIPTION OF THE DRAWINGS

In order that the invention be more easily understood, specific embodiments will be described with reference to the following drawings.

DETAILED DESCRIPTION OF PREFERRED EMBODIMENTS

Figure 1A:
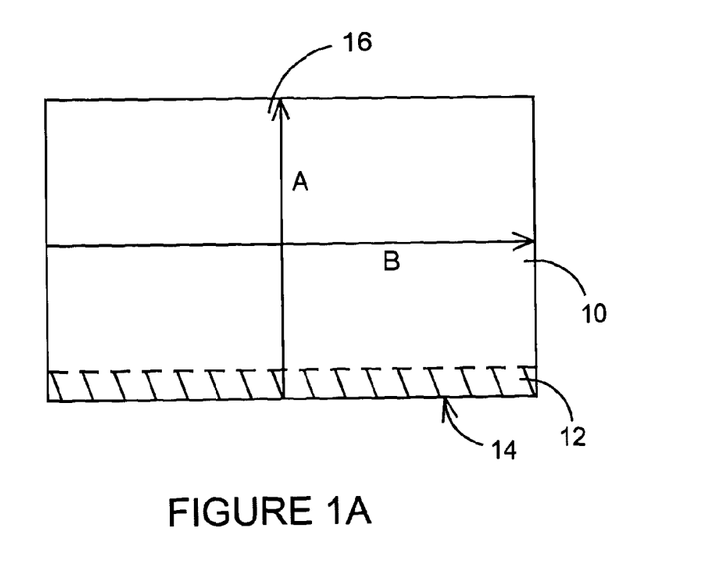
FIG. 1A shows a mat, a part of which is treated with an erosion resistant material.
Figure 1B:
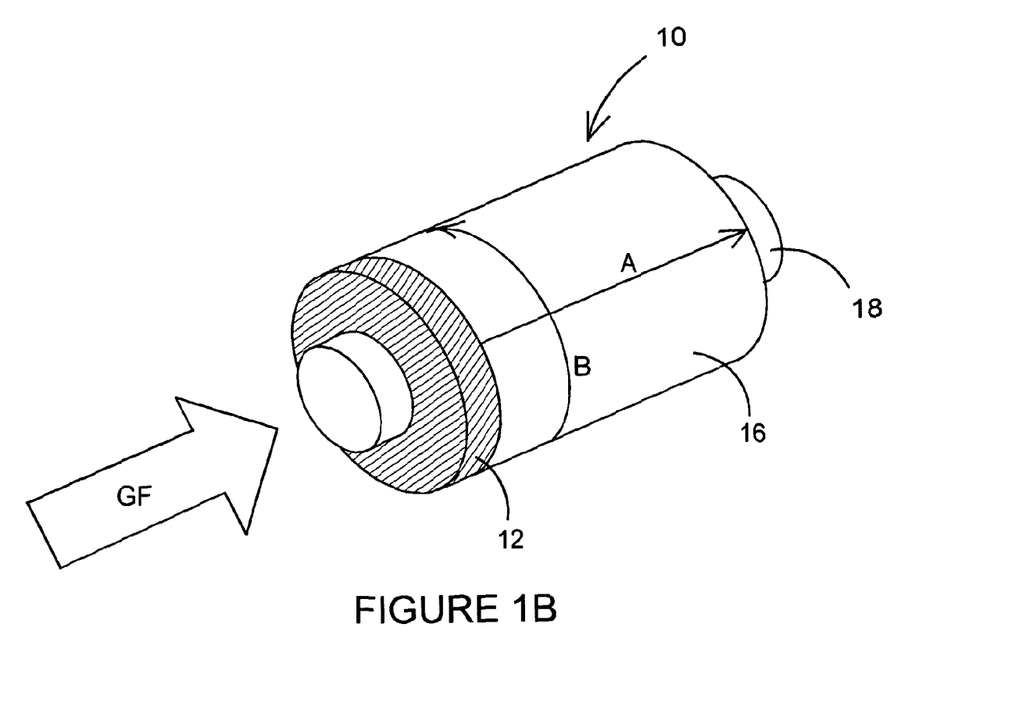
FIG. 1B shows a mat, a part of which is treated with an erosion resistant material, wrapped around a monolith.

With reference to FIGS. 1A and 1B, there is provided a mat 10 having principal dimensions length A and width B, the mat 10 being shaped for wrapping around a monolith 18 such that dimension A is aligned along the principal axis of the monolith 18. The mat 10 is comprised of non-woven alumina silica fibres and includes an organic, e.g. latex, binder which helps to maintain its structural integrity during handling. The mat is treated with an erosion resistant material in that a portion 12 of the mat, inward of a first edge 14 and parallel with dimension B comprises a silica gel. The remaining portion 16 of the mat 10 is substantially free from such silica gel. The portion 12 of the mat 10 which comprises the silica gel is arranged such that the edge 14 along which it is positioned is perpendicular to the longitudinal axis (corresponding to length A) of the mat 10 when it is wrapped around a monolith 18, as is shown in FIG. 1B.

When the monolith 18 and mat 10 are canned and installed in a car exhaust system, the portion 12 of the mat 10 which comprises the silica gel provides the leading edge to gas flow (GF), i.e. it is positioned upstream of the rest of the mat. In this way, excellent erosion resistance properties are observed.

The silica gel is applied to the mat by means of a silica precursor mixture.

Figure 2:
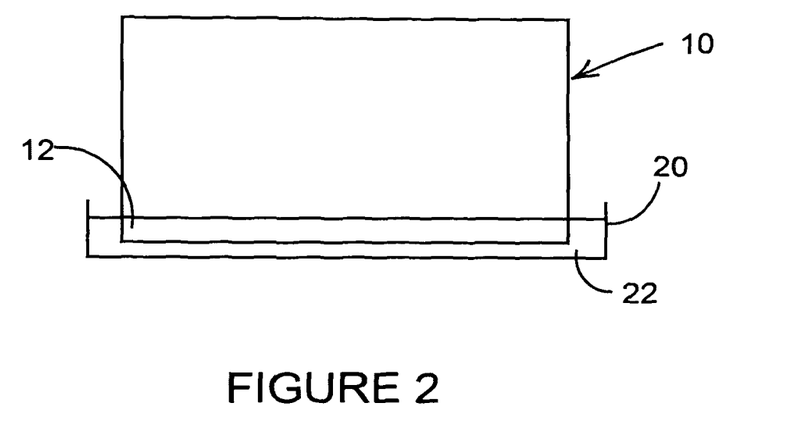
FIG. 2 a mat being treated with an erosion resistant material.

A simple method of applying the silica gel to the mat 10 is shown in FIG. 2. A is trough 20 is filled with a silica precursor mixture, as described below, and the mat 10 is dipped into the trough 20 such that the solution 22 impregnates the portion 12 of the mat 10 which is adjacent the edge 14. The mat is left in the solution for a period of between a few seconds and several minutes. It is preferable that the mat 10 is wetted and any gel already formed begins to adhere to the fibres during dipping, and that the gelling will continue in the mat 10 after dipping. A second dipping step may also be performed.

The mat 10 is dried in air at ambient or elevated temperatures, and/or at reduced pressure, to provide a flexible mat. Colloidal or polymeric silica from the dried gel adheres to the ends and surfaces of the fibres in the mat 10. The mat 10 is easily canned, with little or no damage to the silica gel.

The chemistry of organosiloxanes such as TEOS provides for a convenient silica precursor for applying a silica gel to the mats 10.

TEOS is not readily soluble in water, though an aqueous suspension of TEOS particles may be formed. Solubility may be improved by the addition of short chain alcohols, such as ethanol or propanol to the water.

When TEOS does dissolve in water it tends to hydrolyse to form silica monomers and ethanol, which silica monomers may undergo a condensation reaction to form silica gel and/or dimers and/or oligomers and/or polymers.

In fact, commercially available TEOS "solutions", which are often referred to as ethyl silicate solutions, may contain dimers and other oligomers of ethyl silicate, the TEOS having been subjected to an initial hydrolysis and condensation treatment. Once such commercially available ethyl silicate solution is ADOMINE ES-40, produced by Allchem of Slough, UK.

By careful use of acid or base catalysts, TEOS/ethyl silicate solutions can be exploited by means of an efficient sol-gel reaction to produce a silica gel. It is this reaction which takes place in the solution 22 in which the mat 10 is dipped, and on the wetted portion 12 of the mat 10 after dipping.

A solution 22 for treating the mats 10 may typically comprise an ethyl silicate solution, one or more short chain alcohols such as propanol or methylated spirit, water and a small quantity of an acid or base catalyst.

Both weak and strong acids and weak and strong bases may be used as catalysts.

Figure 3A:
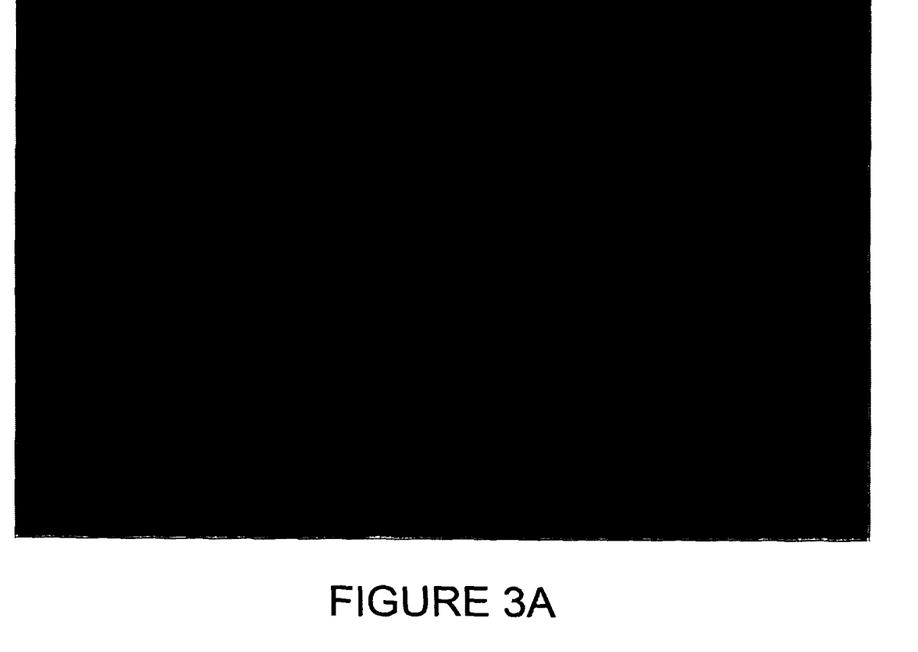
FIG. 3A shows an SEM photograph of a mat according to the invention and FIG. 3B shows an SEM photograph of a comparative mat.

FIG. 3A shows an SEM photograph of fibres of a mat treated with such a silica precursor solution, clearly showing fibres coated with the silica gel so formed. The thickness of the coating is relatively small compared to the thickness of the fibre. Without wishing to be bound by any particular theory, it is postulated that this relative thickness is provided by the low silica solids content in the treatment mixture and/or the controlled gelling time offered by the catalyst in the treatment mixture.

In particular, it is noted that the interstices of the fibres are substantially free from the build up of any material, e.g. particulate material such as particulate silica.

The coated fibres provide excellent erosion resistance while maintaining flexibility of the mat.

Figure 3B:
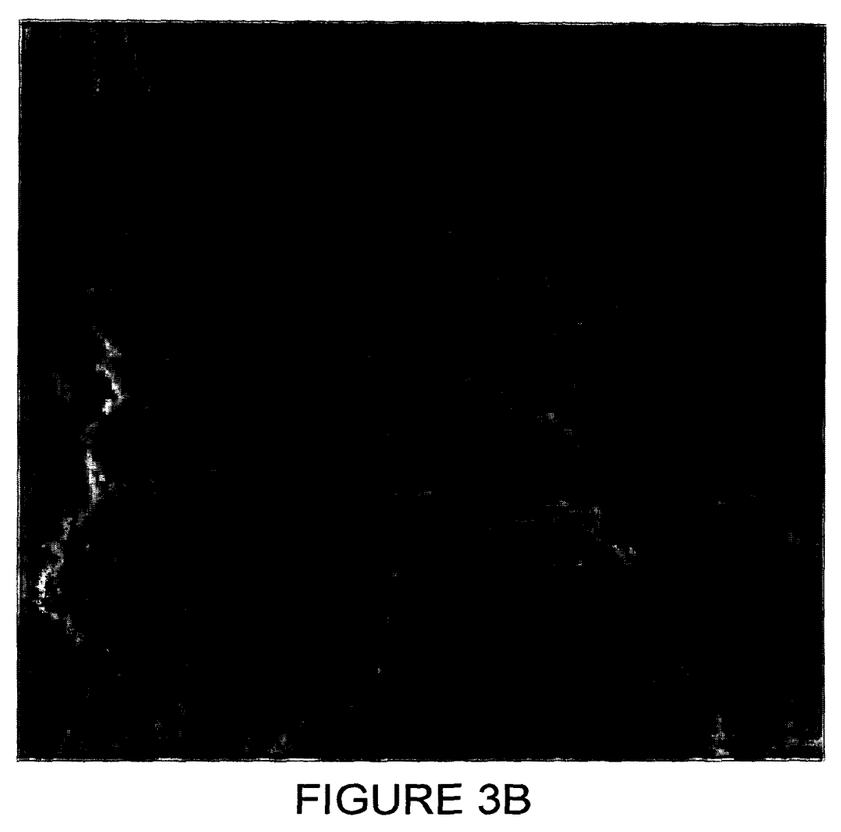

FIG. 3B shows an SEM photograph of fibres of a mat treated with a commercially available silica colloid known as "Dow 84" (available from Dow Covering). As can be clearly seen, particulate material fills and bridges the interstitial spaces between fibres.

Figure 4:
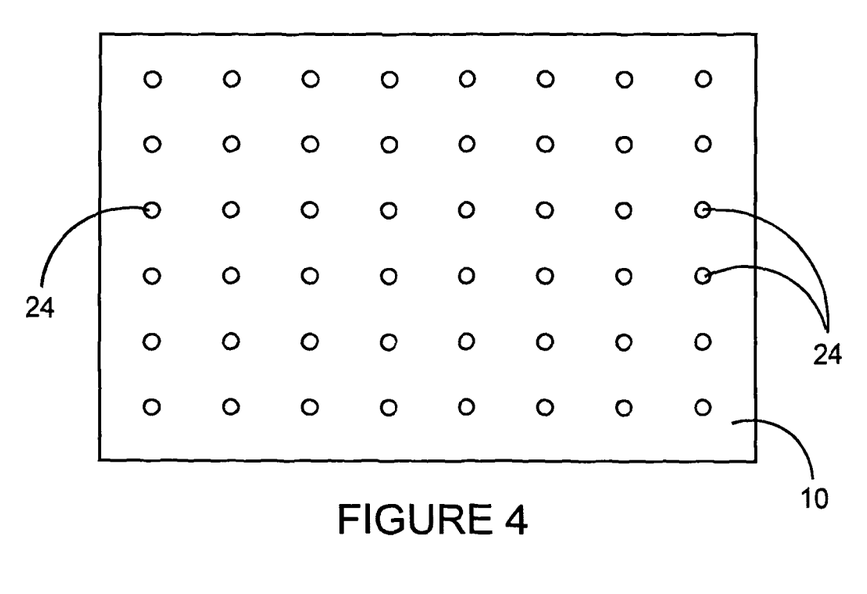
FIGS. 4 and 4A show a mat having a plurality of portions treated with an erosion is resistant material.
Figure 4A:
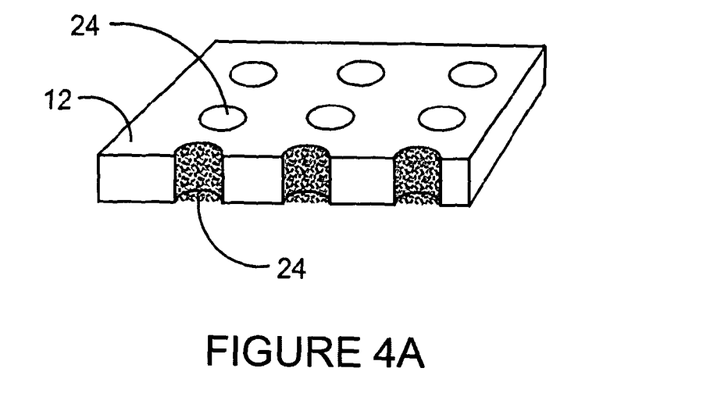

In another embodiment, as shown in FIG. 4, there is provided a mat 10 for mounting a catalytic convertor. The mat 10 comprises non-woven alumina silica fibres and a latex binder which helps to maintain structural integrity during handling and improving high pressure performance.

A plurality of columns 24 of silica gel extend through the mat 10 such that a pattern of spots is formed on the surface of the mat. These columns 24 provide excellent erosion resistance in use as well as giving further structural integrity, while allowing the mat to be wrapped easily around a monolith during installation.

Columns 24 are manufactured by injecting aliquots of an ethyl silicate mixture, as described above, into the mat. Alternatively, the ethyl silicate mixture may be spotted onto the surface of the mat and the column allowed to form by capillary action through the mat. Additional solvent, such as isopropanol, may be added to the columns 24 after injection or spotting to promote capillary action and/or to control the concentration profile of silica the column.

Variation of the grid pattern of the columns and/or the concentration of the ethyl silicate mixture and/or the quantity of the ethyl silica mixture used to make the columns can vary the pressure performance (PP) and the flexibility of the mat. As the skilled person understands, it is desirable to produce a mat with as high PP and flexibility as possible.

The present invention provides means for increasing the PP, while retaining flexibility, and some or all of the above described parameters may be altered to provide optimal performance with mats of different fibres and/or basis weights and/or thicknesses. For example, it may be desirable to load more silica precursor into a mat of greater thickness and/or basis weight than into a thinner and/or lighter mat.

Of course, it may also be desirable to treat the entire mat with an ethyl silicate mixture or other such aqueous silica precursor. This may be carried out by simply immersing a mat in such a mixture or spraying the mixture onto the mat (for example to provide a layer of silica on one or both major surfaces of the mat), before allowing it to dry. Alternatively, the fibres themselves may be treated with an ethyl silicate mixture or other such aqueous silica precursor prior to their formation into a mat.

It is also recognised that the silica treatment may have an effect of repairing defects in fibres or damaged fibres.

In order that the invention may be more fully understood, I now refer to the following non-limiting examples.

EXAMPLE 1

A liquid A containing, by volume:
66% ethyl silicate solution (40% silica solids, partially hydrolysed and partially to condensed)
32% Propanol
0.5% Piperidine
0.5% Water
and a liquid B containing, by volume:
75% Methylated spirit
25% Water
were mixed in a ratio of A:B, by volume, of 1:3 to make a silica precursor liquid C.

Immediately, an alumina silica fibre mat, of density of approximately 0.15 $gcm^{-3}$ to 0.2 $gcm^{-3}$, fabricated from Saffil® fibres was partially immersed in liquid C such that a portion running the length of its leading edge and 5 mm wide was saturated.

The mat was then removed and dried at ambient temperature and pressure for two days. The mat was handleable and flexible.

In order to determine the erosion resistance of the mats, two tests were used, as follows:

Erosion Test 1

In order to test the erosion resistance of the mats, the following test was applied:

First, the mat is compressed to a fibre gap bulk density (FGBD) of 0.6 $gcm^{-3}$ and held for 300 seconds.

The mat is then held at FGBD 0.4 $gcm^{-3}$ while its binder is burned out at up to 900° C. and is cycled at FGBD 0.4 $gcm^{-3}$ and 15% RGE for 2500 cycles.

The mat is then held in a spacer at a compression of FGBD 0.3 $gcm^{-3}$ while it is subjected to a 200 Hz pulsed stream of air at ambient temperature and at a pressure of 0.16 MPa for 50 minutes. The nozzles emitting the jet of air were positioned 11 mm from the mat.

The volume of the mat which has been eroded was measured using a fluid displacement test.

Erosion Test 2

The second erosion test, simulating conditions in a close coupled catalytic convertor, consists of the steps:

Compressing the mat to FGBD 0.56 $gcm^{-3}$ for 300 seconds.

Holding the mat in a compression of FGBD 0.3 $gcm^{-3}$ and to burn out the binder at up to 700° C. and cycling for 2500 cycles at FGBD 0.3 $gcm^{-3}$ and 8% RGE.

Holding the mat in a spacer at a compression of FGBD 0.27 $gcm^{-3}$ while it is subjected to a 200 Hz pulsed stream of air at ambient temperature and at a pressure of 0.16 MPa for 50 minutes. The nozzles emitting the jet of air were positioned 11 mm from the mat.

As in Erosion Test 1, the volume of the mat was measured by a displacement test to assess the level of erosion.

A mat produced according to Example 1 was tested by Erosion Test 1 and Erosion Test 2, in each case with the treated edge facing into the pulsed stream of air. The results are shown in Table 1, below.

COMPARATIVE EXAMPLE 1

A needled mullite fibre mat having a bulk density of around 0.16 $gcm^{-3}$ was subjected to Erosion Test 1.

COMPARATIVE EXAMPLE 2

A needled mullite fibre mat having a bulk density of around 0.16 $gcm^{-3}$ was subjected to Erosion Test 2.

COMPARATIVE EXAMPLE 3

An alumina silica fibre mat, impregnated with silica sol was subjected to Erosion Test 2.

TABLE 1

Erosion test results of mats of Examples 1 and Comparative Examples 1 to 3

| Example | Erosion Test | Eroded Volume/mm³ |
|---------|--------------|-------------------|
| 1 | 1 | 0 |
| 1 | 2 | 0 |
| CE1 | 1 | 28 |
| CE2 | 2 | 50 |
| CE3 | 2 | >100 |

Figure 5:
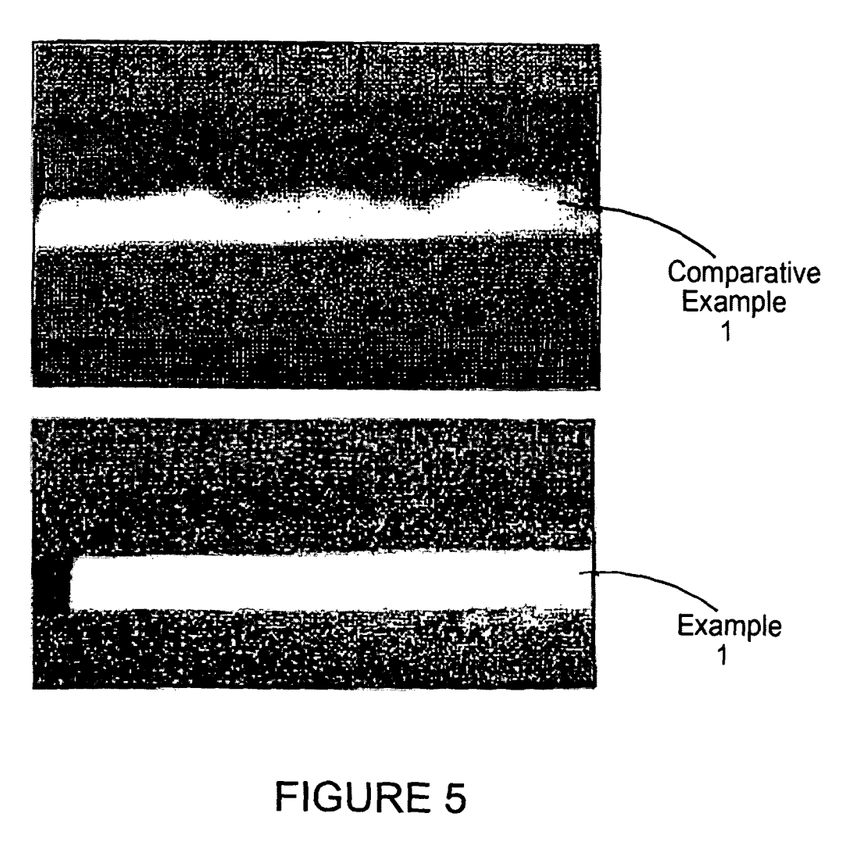
FIG. 5 shows photographs of mats according to Comparative Example 1 and Example 1.
Figure 6:
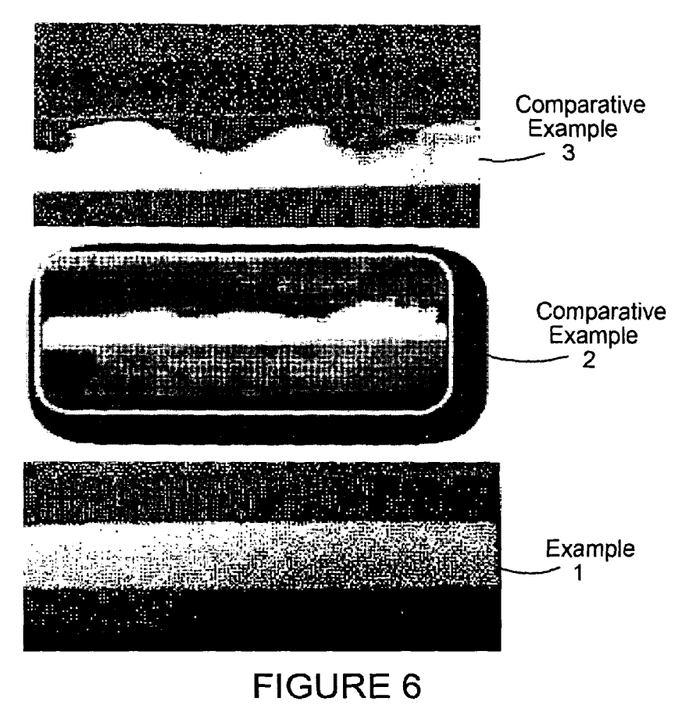
FIG. 6 shows photographs of according to Comparative Example 1, Comparative Example 2 and Example 1.

FIGS. 5 and 6 show photographs of the eroded mats following these tests, clearly to showing that while all of the mats of the comparative examples were eroded to a greater or lesser extend, the mats of Example 1 suffered no erosion at all in either test.

EXAMPLES 2 TO 8

Several further mats were prepared, substantially according to the method of Example 1. However, different quantities of ethyl silicate were used in each treatment solution in order to assess an optimum silica solids concentration for effective erosion resistance.

Each of these mats was subjected to Erosion Test 2.

TABLE 2

Erosion test results of mats of Examples 2 to 8

| Example | % Silica Solids in Solution | Eroded Volume/mm³ |
|---------|-----------------------------|-------------------|
| 2 | 4.4 | 0 |
| 3 | 3.2 | 0 |
| 4 | 2.1 | 0 |
| 5 | 1.1 | 0.4 |
| 6 | 0.5 | 0.5 |
| 7 | 0.2 | 0.7 |
| 8 | 0.1 | 16.8 |

Figure 7:
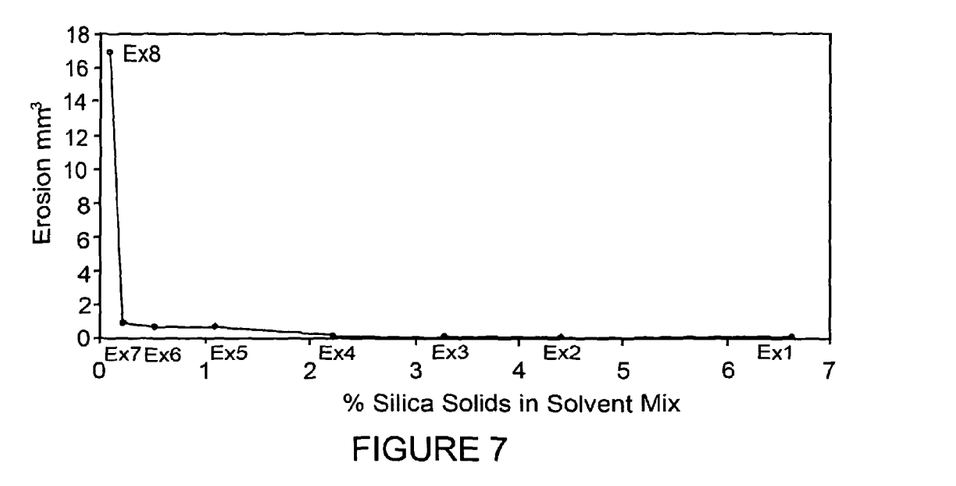
FIG. 7 shows a graph of erosion characteristics of mats of the invention treated with piperidine catalysed mixtures of differing silica solids content.

As can be seen from FIG. 7, where the results are displayed graphically, the mats of the invention appear to be fully erosion resistant when treated with an ethyl silicate formulation having a silica solids concentration of just 2%, while mats have very effective erosion resistance when treated with an ethyl silicate solution having a silica solids concentration of just 0.2%. Moreover, the mat of Example 8, treated with an ethyl silicate solution having a silica solids concentration of 0.1% shows a considerably improved erosion resistance compared to a needled mat.

Flexibility Test 1

Mats having dimensions of 200 mm (width) and 160 mm (length) are tested to determine the minimum diameter around which it can be wrapped without splitting the mat.

EXAMPLES 9 TO 13

Several further mats were prepared, substantially according to the method of Example 1. However, different quantities of ethyl silicate were used in each treatment solution in order to assess effects of the silica on the flexibility of the finished mats according to Flexibility Test 1.

COMPARATIVE EXAMPLE 4

An untreated mat of dimensions of 200 mm (width) and 160 mm (length) was tested according to Flexibility Test 1.

TABLE 3

Flexibility Test 1 results of mats of Examples 9 to 13

| Example | % Silica Solids in Solution | Minimum wrapping diameter/mm |
|---|---|---|
| 9 | 20 | 98 |
| 10 | 15 | 94 |
| 11 | 10 | 86 |
| 12 | 5 | 82 |
| 13 | 2 | 77 |
| CE4 | 0 | 74 |

Of course, as is understood by one skilled in the art, the use of more flexible untreated mats, for example as may be commercially available, would enable those mats when to have correspondingly greater flexibility.

EXAMPLES 14 TO 16

In order to assess the impact of ethyl silicate gelling time on the erosion performance of the mats, mats were prepared using 5 w/w % silica solids solutions made substantially according to Example 1, having various concentrations of piperidine catalyst. The concentrations of catalyst solutions are shown in Table 4, below.

The mats were subjected to Erosion Test 1. The results are shown in Table 4, below.

TABLE 4

Erosion Test 1 results of Examples 14 to 16

| Example | % Piperidine in Solution | Gel Time/min | Eroded Volume/mm$^3$ |
|---|---|---|---|
| 14 | 1 | 10 | >50 |
| 15 | 0.5 | 15-20 | >50 |
| 16 | 0.2 | >60 | 0 |

The results of Examples 14 to 16 clearly show that by careful control of the gelling time by the use of small quantities of catalyst, improvements in erosion performance can be achieved using treatment mixtures having low silica solids concentrations. This also provides increased flexibility in the finished mats.

Figure 8A:
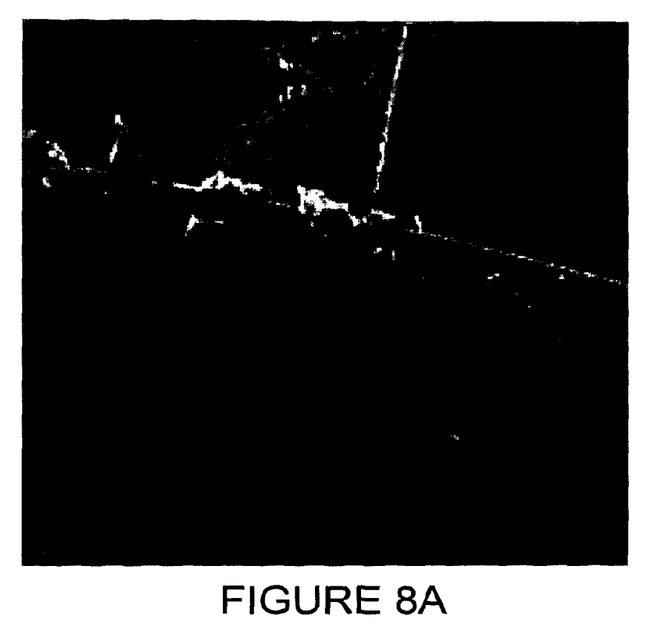
FIG. 8 shows SEM photographs of mats according to the invention.

Without wishing to be bound by any particular theory, it is postulated that fast gelling rates produce crude gel structures that are brittle and susceptible to mechanical damage. This is demonstrated by an SEM photograph of the treated fibres of Example 14, as shown in FIG. 8A.

Figure 8B:
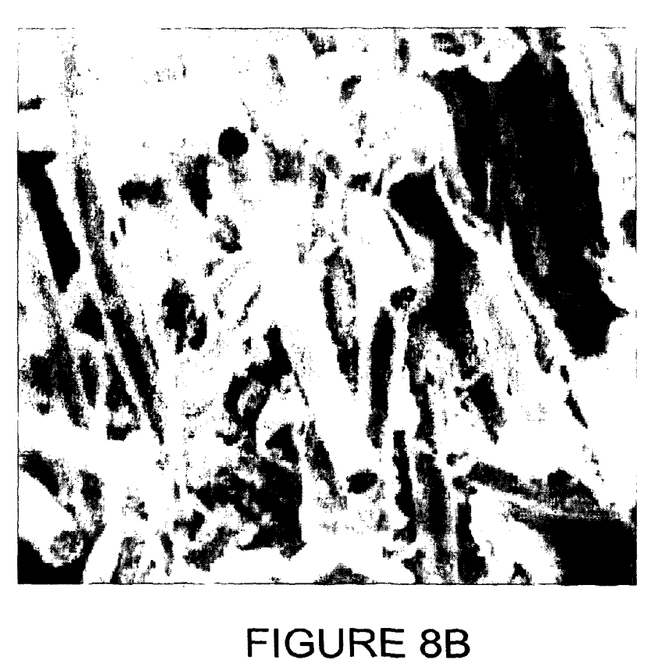

FIG. 8B, on the other hand shows an SEM photograph of the treated fibres of Example 16. The slow gelling rate has produced evenly coated fibres which are less porous and less brittle.

EXAMPLES 17 TO 21

Columns of Liquid A (each approximately 0.05 cm$^3$) were injected into aluminosilicate mats formed using Saffil® Fibres. To each of these columns was then added approximately 0.55 cm$^3$ Liquid B. The columns were positioned in a square grid pattern on each mat at spacings as shown in Table 5 below. The columns themselves were of approximately 1 mm in diameter, before any of the solvent had wicked outwardly.

The mats were dried in air for two days and were handleable and flexible.

The PP of the mats was tested using the following test method.

Pressure Performance (PP) Test

Mats are fired up to 700° C. to remove any remaining organic species and the binder. The mats are then cycled 2500 times in a spacer between a compression of FGBD 0.4 gcm$^{-3}$ and an 8% relative gap expansion (RGE). The holding pressure was then measured at 8% RGE at the 2500$^{th}$ cycle.

Each of the mats of Examples 17 to 21 were subjected to the PP Test and the results were compared to the PP of a standard, untreated alumina silica fibre mat. The results are shown in Table 3, below, demonstrating that PP tends to increase as the spacing between the columns decreases, the 0.5 cm spaced columns of the mat of Example 21 giving approximately double the PP of the untreated mat.

Flexibility Test 2

Mats having dimensions of 200 mm (width) and 160 mm (length) are tested to determine the load required to bend the mats by 20 mm displacement, using a calibrated load cell.

Each of the mats of Examples 17 to 21 was subjected to the Flexibility Test, together with an untreated alumina fibre mat. The results are shown in Table 3, below.

As can be seen, the mats of Examples 17 to 19 offer at least comparable flexibility to the untreated mat, while also affording a real increase in PP.

TABLE 5

Flexibility and PP of mats of Examples 9 to 13

| Example | Column spacing/cm | PP (% greater than untreated mat) | Flexibility/ mm$^2$N$^{-1}$ |
|---|---|---|---|
| 17 | 2.5 | 19 | 68 |
| 18 | 2.0 | 50 | 84 |
| 19 | 1.5 | 43 | 87 |
| 20 | 1.0 | 77 | 115 |
| 21 | 0.5 | 98 | 170 |
| Untreated mat | — | 0 | 60 |

EXAMPLE 22

100 g of a single solution formulation for treating mats was made up by mixing:
40 g solution of ethyl silicate (40% silica solids, prehydrolysed containing small polymer chains);
46.2 g isopropanol;
13.8 g water.

This solution equates to a silica solids content of approximately 16%.

This solution was made up at pH 6, using acetic acid and was injected into an alumina silica fibre mat to form columns (0.6 cm$^3$ per column) in a square grid is pattern at 1.5 cm spacing. The mat was dried in air for 1 day.

The remaining solution gelled slowly and it was possible to continue to use the remaining solution for several hours.

This mat was then tested by Erosion Test 2 and was found to demonstrate zero erosion.

EXAMPLES 23 TO 35

The effect of the silica solids concentration and pH of the ethyl silicate mixture was further investigated in Examples 23 to 35. Mixtures were made up in a similar manner to that of Example 14, using various concentrations of silica solids and different pHs, using various acids and bases, as demonstrated in Table 4, below. Each mixture contained approximately equal stoichiometric quantities of water and isopropanol.

Mats were then treated with these mixtures to form columns in a square grid pattern at 1.5 cm spacing. The mats were then subjected to the PP test. The results are shown in Table 6.

TABLE 6

PP of mats of Examples 23 to 35

| Example | % Silica Solids | pH/acid or base added | PP/kPa |
|---|---|---|---|
| 23 | 22.86 | pH 6/none added | 145 |
| 24 | 22.86 | pH 2/HCl | 132 |
| 25 | 22.86 | pH 5/acetic acid | 126 |
| 26 | 22.86 | pH 8/ammonia | 127 |
| 27 | 16 | pH 6/none added | 141 |
| 28 | 16 | pH 2/HCl | 135 |
| 29 | 16 | pH 5/acetic acid | 121 |
| 30 | 16 | pH 8/ammonia | 104 |
| 31 | 16 | pH 2/HCl | 133 |
| 32 | 8.4 | pH 6/none added | 124 |
| 33 | 8.4 | pH 2/HCl | 127 |
| 34 | 8.4 | pH 5/acetic acid | 112 |
| 35 | 35.6 | pH 6/acetic acid | 137 |

The results appear to show that a pH close to neutral provides improved PP, while reducing the concentration of silica solids in the mixture leads to a fall off in PP.

Figure 9:
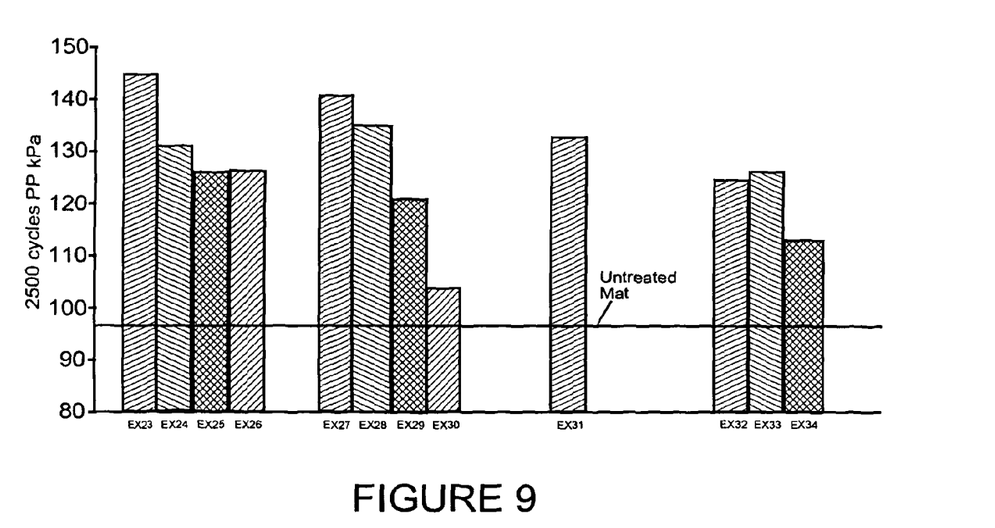
FIG. 9 a bar chart of the pressure performance of several mats according to the invention.

The results are shown graphically in FIG. 9, which also displays a line denoting the PP of an untreated mat. All examples show a considerable improvement in PP over an untreated mat.

Examples 34 and 35 were also tested according to Erosion Test 2, and were found to have suffered no erosion.

EXAMPLES 36 TO 39

The effect of the drying conditions of the mats was investigated in Examples 36 to 39.

Examples 36 to 38 provide mats treated by a solution made up in a similar manner to that of Example 22 but having a silica solids concentration of 22.86%, catalysed by acetic acid. The treatment comprised forming columns in a square grid arrangement at 1.5 cm spacing.

Example 39 provides a mat treated by a solution made up in a similar manner to that is of Example 22 but having a silica solids concentration of 35.7%, catalysed by acetic acid. The treatment comprised forming columns in a square grid arrangement at 1.5 cm spacing.

Each of the mats was subjected to the PP test. The results are shown in Table 5 below.

TABLE 7

Drying time of mats of Examples 36 to 39

| Example | Drying Time | Drying Temp/° C. | PP/kPa |
|---|---|---|---|
| 36 | 1 Day | 25 | 141 |
| 37 | 3 hr | 60 | 135 |
| 38 | 1 hr | 60 | 128 |
| 39 | 2 hr | Ambient | 134 |

Figure 10:
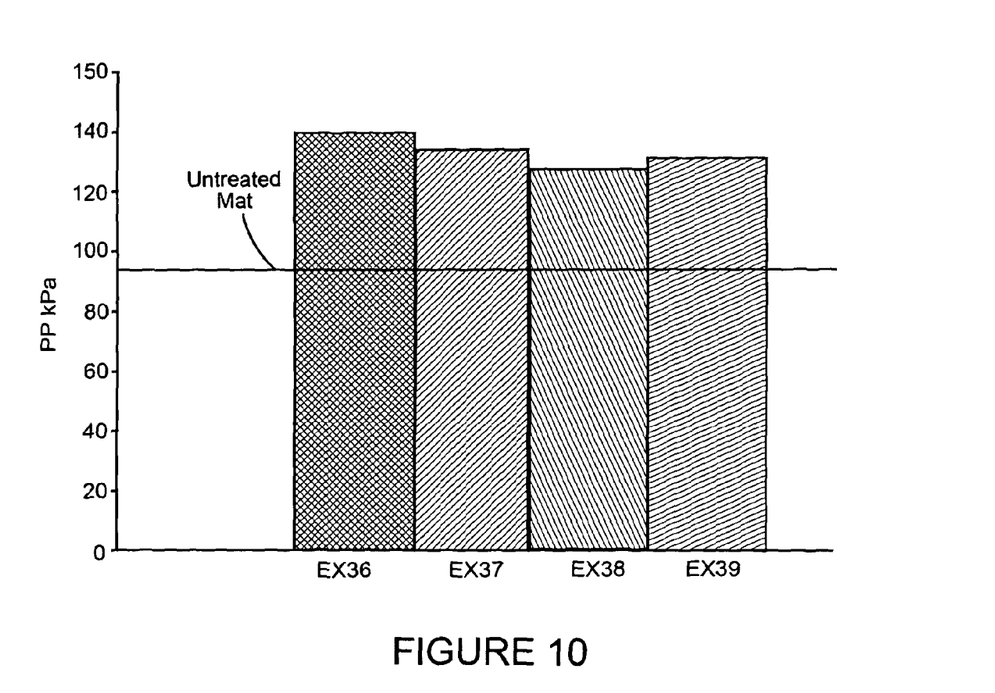
FIG. 10 shows a bar chart of the pressure performance of several mats according to the invention.

The results appear to show that drying time can be reduced significantly from 1 day to 1 to 3 hours, while having little impact on the PP of the mat. The results are shown graphically in FIG. 10, which also displays a line denoting the PP of an untreated mat.

EXAMPLES 40 TO 42

The use of ethyl silicates to treat an entire major surface of a mat was investigated in Examples 40 to 42. In each Example, a 4 w/w % silica solids solution (made substantially according to that of Example 1) was sprayed onto the surface of an alumina silica fibre mat. The mat was dried and tested according to the Friction Test, the results being shown in Table 8, below.

Friction Test

In order to assess the coefficient of friction of the sample mats, a pair of mats is placed in a load cell either side of central panel. If the mats have a treated major surface, that surface is positioned so as to contact the central panel. The load cell is then adjusted to compress the mats to a desired fibre gap bulk density and the force $F_1$ required to do so is recorded. The central panel is removed and the maximum pull-out force $F_2$ is recorded. The coefficient of friction is calculated as $F_1/F_2$.

TABLE 8

Results of Friction Tests for Examples 40 to 41.

| Example | FGBD | Untreated friction measurement | Treated friction measurement | Friction Boost/% |
|---|---|---|---|---|
| 40 | 0.3 | 0.413 | 0.499 | 17 |
| 41 | 0.4 | 0.278 | 0.313 | 11 |
| 42 | 0.5 | 0.209 | 0.216 | 4 |

These results provide a significant increase in friction at low FGBD, potentially meaning a reduction in the quantity of fibre in each mat can be achieved, without a corresponding loss in holding pressure.

EXAMPLES 43 TO 45

Use of different silica solids concentrations in surface treatment of mats was investigated in Examples 43 to 45. The mats were made substantially as according to Examples 40 to 42, containing 8 w/w % silica solids (Example 43), 10 w/w % silica solids (Example 44) and 12 w/w % silica solids (Example 45).

Push Out Test

In order to test the performance of a mat in holding a monolith, the mat is wrapped around a monolith and canned so as to provide a FGBD of 0.3. If the mat has a treated major surface, that surface is arranged to face the can. The canned assembly is then heated to 900° C. and allowed to call. An axial force is then applied to the monolith in order to move it through 5 mm, the magnitude of that force being continually measured.

Figure 11A:
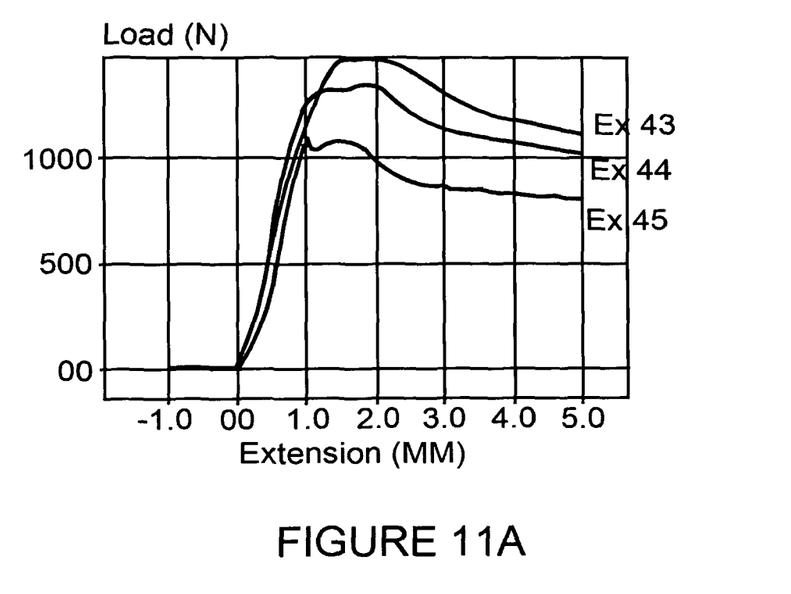
FIG. 11 shows a graph of the Push Out characteristics of mats according to the present invention and the prior art.
Figure 11B:
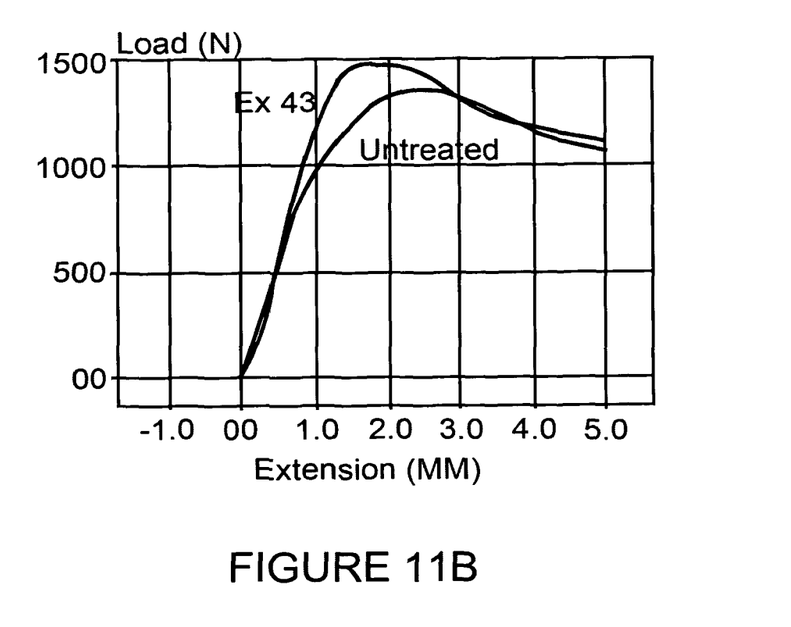

Examples 43 to 45 were tested according to the Push Out Test. FIG. 15A shows a plot of the measured force against movement for each. FIG. 11B shows a plot of the measured force against movement for an untreated mat and the mat of Example 43.

The mat of Example 43 shows a maximum push out force of 1490N, representing an 8% increase over an untreated mat.

EXAMPLES 46 TO 47

Alumina silica fibres were treated with ethyl silicate solutions made substantially according to that of Example 1, having a piperidine catalyst concentration of 0.2 w/w % and silica solids concentrations as shown in Table 9, below, and then dried.

Mats were then made by slurrying the resultant fibres with a latex binder and those mats were tested according to the Pressure Performance Test.

TABLE 9

Results of PP Test for Examples 46 and 47

| Example | w/w % Silica solids in treatment solution | PP/kPa |
|---|---|---|
| 46 | 0.5 | 110 |
| 47 | 1 | 136 |
| Untreated Mat | — | 85 |

The mats may be formed by wet laying papermaking techniques using a binder, needling or other consolidation techniques or dry laying techniques and suitably consolidated.

In some embodiments, the silica precursor mixture may be printed or sprayed onto the mat. This may be followed by the addition of further solvent, such as isopropanol, to aid penetration of the mat by the precursor.

The mat may be other insulation materials, end cones and so on, in fact any material against which gas impinges. The skilled person will also recognise that the mat may also be used in marine or static applications.

No doubt many other effective alternatives will occur to the skilled person. It will be understood that the invention is not limited to the described embodiments and encompasses modifications apparent to those skilled in the art lying within the spirit and scope of the invention.

The invention claimed is:

1. A mounting mat comprising one or more first portions comprising fibres at least partially coated with a silica precursor, which forms an erosion resistant inorganic gel composition on the fibres, wherein said silica precursor comprises a compound having the general formula:

where $R^1$ to $R^4$ are the same or different and may comprise H or substituted or unsubstituted alkyl chains.

2. A mat according to claim 1, wherein a major surface area of the first portion or portions comprises less than 80% of the major surface area of the mat.

3. A mat according to claim 2, wherein the major surface area of the first portion or portions comprises less than 40%, less than 30%, less than 20% or less than 10% of the major surface area of the mat.

4. A mat according to claim 1, wherein at least part of the first portion is adjacent at least part of an intended leading edge of the mat.

5. A mat according to claim 1, wherein one or each of said at least one first portions extend through at least a part of an entire thickness of the mat.

6. A mat according to claim 1, wherein the mat comprises a plurality of the first portions.

7. A mat according to claim 6, wherein the first portions are arranged in a random or regular pattern across a major surface of the mat.

8. A mat according to claim 6, wherein the plurality of first portions comprise columns of the erosion resistant inorganic gel composition, which columns extend through part or substantially all of a thickness of the mat.

9. A mat according to claim 8, wherein the columns are arranged in a regular pattern, each first column being between 1 mm and 50 mm from its nearest neighbour or neighbours.

10. A mat according to claim 1, wherein at least part of the mat comprises an erosion resistant material and wherein the mat undergoes 28 $mm^2$ or less of erosion when subjected to Erosion Test 1 and the mat undergoes 50 $mm^2$ or less of erosion when subjected to Erosion Test 2.

11. A mat according to claim 1, wherein the mat has a minimum wrapping diameter of less than 100 mm according to Flexibility Test 1 and a flexibility of less than 180 $mm^2N^{-1}$ according to Flexibility Test 2.

12. A catalytic convertor comprising the mounting mat of claim 1.

13. A catalytic convertor comprising the mounting mat of claim 1, wherein the inorganic gel composition comprises a silica compound or silicone polymer or gel, formed on the fibres by an acid or base catalysed reaction of a silica precursor.

14. A mat according to claim 1, wherein at least part of the mat comprises an erosion resistant material and wherein the mat undergoes 28 $mm^2$ or less of erosion when subjected to Erosion Test 1 or the mat undergoes 50 $mm^2$ or less of erosion when subjected to Erosion Test 2.

15. A mat according to claim 1, wherein the mat has a minimum wrapping diameter of less than 100 mm according to Flexibility Test 1 or a flexibility of less than 180 $mm^2N^{-1}$ according to Flexibility Test 2.

16. The mat according to claim 1, further comprising a second portion substantially free from said silica precursor.

17. The mat according to claim 1, wherein said silica precursor forms an erosion resistant inorganic gel composition on the fibres by an acid or base catalyzed reaction.

* * * * *